(12) United States Patent
Yamashita et al.

(10) Patent No.: US 11,029,230 B2
(45) Date of Patent: *Jun. 8, 2021

(54) UNBALANCE DETECTION DEVICE, AND UNBALANCE DETECTION METHOD

(71) Applicant: MITSUBISHI HEAVY INDUSTRIES ENGINE & TURBOCHARGER, LTD., Sagamihara (JP)

(72) Inventors: Katsuya Yamashita, Tokyo (JP); Shuichi Miura, Tokyo (JP); Yosuke Dammoto, Tokyo (JP); Takaya Futae, Tokyo (JP); Shota Yoshikawa, Tokyo (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 152 days.

This patent is subject to a terminal disclaimer.

(21) Appl. No.: 16/303,058

(22) PCT Filed: May 26, 2016

(86) PCT No.: PCT/JP2016/065543
§ 371 (c)(1),
(2) Date: Nov. 19, 2018

(87) PCT Pub. No.: WO2017/203648
PCT Pub. Date: Nov. 30, 2017

(65) Prior Publication Data
US 2019/0301359 A1    Oct. 3, 2019

(51) Int. Cl.
*G01M 1/16* (2006.01)
*G01M 1/04* (2006.01)
(Continued)

(52) U.S. Cl.
CPC ............ *G01M 1/04* (2013.01); *G01M 1/02* (2013.01); *G01M 1/06* (2013.01); *G01M 1/16* (2013.01); *G01M 1/22* (2013.01); *F02B 39/16* (2013.01)

(58) Field of Classification Search
CPC .............................................. G01H 9/00–008
See application file for complete search history.

(56) References Cited

U.S. PATENT DOCUMENTS

| 2,874,008 A | 2/1959 | Orte et al. |
| 4,325,259 A * | 4/1982 | Willertz ............... G01H 9/00 73/653 |

(Continued)

FOREIGN PATENT DOCUMENTS

| CN | 1109147 A | 9/1995 |
| CN | 1353247 A | 6/2002 |

(Continued)

OTHER PUBLICATIONS

English Translation of EP 2581553 (Year: 2013).*
(Continued)

*Primary Examiner* — Alexander A Mercado
(74) *Attorney, Agent, or Firm* — Birch, Stewart, Kolasch & Birch, LLP.

(57) ABSTRACT

An unbalance detection device for detecting unbalance of a rotor of a turbo-cartridge which includes the rotor including a turbine wheel and a compressor wheel coupled via a rotational shaft and a bearing housing accommodating a bearing which supports the rotor rotatably, includes: a turbine-side housing member accommodating the turbine wheel; a compressor-side housing member accommodating the compressor wheel; a support mechanism configured to nip and support the turbo-cartridge from both sides by pressing at least one of the turbine-side housing member or the compressor-side housing member toward the turbo- (Continued)

cartridge; a vibration insulator interposed in each of a gap between the turbine-side housing member and the turbo-cartridge and a gap between the compressor-side housing member and the turbo-cartridge; and a vibration sensor installed so as to be contactable with the bearing housing, the vibration sensor being capable of detecting vibration upon rotation of the rotor.

12 Claims, 6 Drawing Sheets

(51) Int. Cl.
*G01M 1/22* (2006.01)
*G01M 1/02* (2006.01)
*G01M 1/06* (2006.01)
*F02B 39/16* (2006.01)

(56) References Cited

U.S. PATENT DOCUMENTS

| | | | | |
|---|---|---|---|---|
| 4,694,689 | A * | 9/1987 | Kawasaki | G01M 1/04 73/114.77 |
| 4,864,859 | A * | 9/1989 | Jensen | G01M 1/22 73/473 |
| 4,900,165 | A | 2/1990 | Kun et al. | |
| 5,197,010 | A * | 3/1993 | Andersson | G01M 1/22 464/180 |
| 6,474,166 | B1 | 11/2002 | Osawa et al. | |
| 9,181,804 | B1 * | 11/2015 | Kennedy | B23P 19/04 |
| 10,119,419 | B2 | 11/2018 | Walter et al. | |
| 2001/0027688 | A1 * | 10/2001 | Yamanaka | G01H 1/00 73/865.6 |
| 2002/0054821 | A1 | 5/2002 | Takeuchi et al. | |
| 2006/0107744 | A1 * | 5/2006 | Li | G01H 9/006 73/657 |
| 2008/0047344 | A1 * | 2/2008 | Gutknecht | F04D 29/0563 73/462 |
| 2008/0289416 | A1 * | 11/2008 | Thelen | G01M 1/04 73/471 |
| 2010/0191380 | A1 * | 7/2010 | Maeda | G01M 1/36 700/280 |
| 2010/0269588 | A1 * | 10/2010 | Thelen | G01M 1/04 73/460 |
| 2014/0007663 | A1 * | 1/2014 | Berger | G01M 15/09 73/112.05 |
| 2014/0200837 | A1 * | 7/2014 | Blair | G01N 29/222 702/48 |
| 2015/0185089 | A1 * | 7/2015 | DeSilva | F02C 9/00 73/112.01 |
| 2015/0198216 | A1 | 7/2015 | Koyama et al. | |
| 2015/0361993 | A1 * | 12/2015 | An | F04D 29/662 416/61 |
| 2016/0016316 | A1 * | 1/2016 | Fowler | B25J 9/0084 700/213 |
| 2016/0102554 | A1 * | 4/2016 | Cornell | B23P 6/002 416/223 A |
| 2016/0223496 | A1 * | 8/2016 | Klos | G01H 1/003 |
| 2017/0138811 | A1 * | 5/2017 | Inoue | G01M 1/18 |
| 2018/0348303 | A1 * | 12/2018 | Unnikrishnan | F03D 17/00 |
| 2019/0162622 | A1 * | 5/2019 | Miura | F16F 15/04 |
| 2019/0301359 | A1 * | 10/2019 | Yamashita | F01D 25/285 |

FOREIGN PATENT DOCUMENTS

| | | |
|---|---|---|
| CN | 101305272 A | 11/2008 |
| CN | 101688816 A | 3/2010 |
| CN | 204239602 U | 4/2015 |
| CN | 104776140 A | 7/2015 |
| CN | 104895807 A | 9/2015 |
| DE | 10 2007 058 592 A1 | 6/2009 |
| DE | 10 2008 025 906 A1 | 12/2009 |
| EP | 0355656 B1 | 2/1994 |
| EP | 1 867 850 A1 | 12/2007 |
| EP | 2 172 758 A1 | 4/2010 |
| EP | 2 581 553 A1 | 4/2013 |
| EP | 2581553 A1 | 4/2013 |
| EP | 2 960 465 A1 | 12/2015 |
| JP | 61-265533 A | 11/1986 |
| JP | 62-135743 A | 6/1987 |
| JP | 3-503315 A | 7/1991 |
| JP | 4-103234 U | 9/1992 |
| JP | 7-18746 B2 | 3/1995 |
| JP | 2001-74547 A | 3/2001 |
| JP | 2003-240054 A | 8/2003 |
| JP | 2004-278580 A | 10/2004 |
| JP | 3835501 B2 | 10/2006 |
| JP | 4232841 B2 | 3/2009 |
| JP | 4236510 B2 | 3/2009 |
| JP | 2011-106845 A | 6/2011 |
| JP | 2013-508599 A | 3/2013 |
| JP | 2014-215160 A | 11/2014 |
| KR | 10-2007-0056700 A | 6/2007 |
| WO | WO 2015/198487 A1 | 12/2015 |

OTHER PUBLICATIONS

Techtips—Anatomy of a Turbocharger: What's Inside and How it Works. (Feb. 3, 2015). Retrieved Jun. 12, 2020, from https://www.cartechbooks.com/techtips/anatomy-of-a-turbocharger-whats-inside-and-how-it-works (Year: 2015).*
Extended European Search Report effective Jun. 7, 2019 issued to the corresponding European Application No. 16903130.9.
Japanese Office Action for Japanese Application No. 2018-518879, dated Aug. 6, 2019, with English translation.
International Preliminary Report on Patentability and Written Opinion of the International Searching Authority (forms PCT/IB/373, PCT/ISA/237, PCT/IB/326 and PCT/IB/338), dated Dec. 6, 2018, for International Application No. PCT/JP2016/065543, with translation of the Written Opinion.
International Search Report (forms PCT/ISA/210 and PCT/ISA/220), dated Jul. 26, 2016, for International Application No. PCT/JP2016/065543.
Office Action effective Mar. 9, 2020 issued to the corresponding EP Application No. 16903130.9.
Chinese Office Action and Search Report dated Jun. 2, 2020, for counterpart Chinese Application No. 201680085938.5, with partial translation.
International Preliminary Report on Patentability and Written Opinion of the International Searching Authority (forms PCT/IB/373, PCT/ISA/237, PCT/IB/326 and PCT/IB/338), dated Dec. 6, 2018, for International Application No. PCT/JP2016/065544, with translation of the Written Opinion.
International Search Report (forms PCT/ISA/210 and PCT/ISA/220), dated Jul. 26, 2016, for International Application No. PCT/JP2016/065544.
Chinese Office Action and Search Report, dated Mar. 3, 2020, for Chinese Application No. 201780045199.1, with an English translation of the Chinese Office Action.
European Office Action, dated Sep. 19, 2019, for European Application No. 16903131.7.
Extended European Search Report, dated Apr. 25, 2019, for European Application No. 16903131.7.
Extended European Search Report, dated Oct. 28, 2019, for European Application No. 17877700.9.
International Search Report, dated Mar. 6, 2018, for International Application No. PCT/JP2017/043187, with an English translation.
Japanese Office Action, dated Aug. 13, 2019, for Japanese Application No. 2018-518880, with an English translation.
Japanese Office Action, dated May 26, 2020 for Japanese Application No. 2016-237649, with English Machine translation.
Supplementary European Search Report effective Apr. 25, 2019 issued in the European Application No. 16903131.7.
Written Opinion of the International Searching Authority, dated Mar. 6, 2018, for International Application No. PCT/JP2017/043187, with an English translation.

(56) References Cited

OTHER PUBLICATIONS

U.S. Office action dated Jun. 18, 2020, for U.S. Appl. No. 16/302,232.
Office Action dated Jul. 3, 2020 issued in counterpart Chinese Application No. 201680085941.7 with machine translation.
Chinese Office Action and Search Report for Chinese Application No. 201780045199.1, dated Oct. 14, 2020, with an English translation.

* cited by examiner

UNBALANCE DETECTION DEVICE, AND UNBALANCE DETECTION METHOD

TECHNICAL FIELD

The present disclosure relates to an unbalance detection device and an unbalance detection method for detecting unbalance of a rotor in a turbo-cartridge including: a rotor coupling a turbine wheel and a compressor wheel via a rotational shaft; and a bearing housing which accommodates a bearing rotatably supporting the rotor.

BACKGROUND ART

For a cartridge, which is a core component of a turbo-charger (hereinafter, turbo-cartridge), balancing of a rotor forming the turbo-cartridge is performed after assembling the turbo-cartridge (see Patent Documents 1 to 4, for instance). This balancing work includes unbalance detection of detecting unbalance of a rotor while the rotor is in rotation, and is a series of works including slightly grinding a part of the rotor to balance the rotor, for instance, if unbalance of the rotor is detected. More specifically, while a turbo-cartridge is supported (fixed) with an unbalance detection device, air is supplied to a compressor wheel to create a state where the rotor is rotating, and vibration upon rotation due to unbalance of the rotor is detected with an acceleration sensor (vibration sensor). The phase of the rotor that causes vibration is determined on the basis of a relationship between the vibration signal S detected with the acceleration sensor and the phase of the rotor detected simultaneously with the vibration signal. Then, the rotor is ground for balancing, where the relationship between the mass to be ground (unit weight) and a change in the magnitude of vibration accompanying the grinding (effect vector) is obtained in advance through experiments by using a turbo-cartridge of the same model (production). Further, on the basis of the above vibration signal S, phase, and effect vector (experiment result), grinding information that includes the optimum mass (weight) and position for balancing the rotor is calculated, and the rotor is ground on the basis of the grinding information.

Meanwhile, the unbalance detection device uses two housing members to accommodate a turbine wheel or a compressor wheel of a rotor, respectively, and supports the bearing housing directly from both sides (see Patent Document 3). At this time, in Patent Document 3, the respective housing members of the turbine-wheel side and the compressor-wheel side are fixed to each other with bolts via a fixing rod. In this bolt-fixing method, the bolt-fastening work is required every time the work-target turbo-cartridge is mounted to the unbalance detection device, which leads to deterioration of the productivity. Thus, Patent Document 4 discloses an unbalance correction device capable of supporting one side of a turbo-cartridge by a clamping method of supporting without bolt-fixing, and reducing the influence of resonance due to coincidence of the unique frequency of the unbalance detection device side and the rotation frequency of the rotor accompanying rotation of the rotor, and improving the accuracy regarding the unbalance correction.

Furthermore, in Patent Documents 3 and 4 describe above, when the turbo-cartridge is supported by the clamping method, the housing member and the bearing housing of the turbo-cartridge are in direct contact. Thus, vibration upon rotation of the rotor is transmitted appropriately to the housing member, via the bearing housing of the bearing supporting the rotor. Thus, the acceleration sensor (vibration sensor) for detecting vibration upon rotation of the rotor is disposed not on the turbo-cartridge side, but on the housing member of the unbalance detection device. With the above configuration, it is unnecessary to provide an acceleration sensor for each cartridge every time each of manufactured turbo cartridges is provided for an unbalance detection device, which makes it possible to improve the efficiency of the sensor providing work in the balancing work and detect vibration of the rotor efficiently.

CITATION LIST

Patent Literature

Patent Document 1: JP2003-240054A
Patent Document 2: JPS62-135743A
Patent Document 3: JPH3-503315A
Patent Document 4: JP4232841B

SUMMARY

Problems to be Solved

As disclosed in Patent Document 4 described above, it is more advantageous to support the turbo-cartridge by the clamping method than the bolt-fixing method, in terms of productivity. In the bolt-fixing method, the bolts need to be fastened or detached, which increases the work time and costs. Thus, it is particularly suitable to support mass-produced turbo-cartridges by the clamping method. However, in a case where the housing member and the bearing housing of the turbo-cartridge are in direct contact in the clamping method as in Patent Document 4, the following problem may arise. That is, in the clamping method, the cartridge is not fixed firmly with bolts, and thus the stability in supporting the turbo-cartridge is not as high as the bolt-fixing method. Thus, the different manners of contact between the bearing housing and the housing member (how the bearing housing and the housing member contact directly) at the time when the turbo-cartridge is supported by the unbalance detection device may affect the vibration property upon rotation of the rotor significantly, such as a change in the resonance point of resonance between the turbo-cartridge and the device described above.

For instance, the above described effect vector is obtained in a state where the bearing housing of the turbo-cartridge and the housing member are supported stably, such as being fixed with bolts. Thus, if the vibration property changes depending on the manner of contact between the members, the correspondence relationship between the cartridge under the balancing work and the effect vector may become inappropriate, which makes it difficult to calculate the grinding information accurately, and also leads to deterioration of yielding such as resulting in defective products. Furthermore, if it is necessary to perform a work for re-doing the support (installation) of the turbo-cartridge to the unbalance detection device (re-clamping) to achieve an appropriate correspondence relationship with the effect vector, it leads to deterioration of the productivity of the turbo-cartridge. Furthermore, it is necessary to detach the housing member from the turbo-cartridge to grind the rotor, and when checking the vibration property after grinding, if the manner of contact after re-clamping is different from the previous one, the vibration property also changes, which may lead to deterioration of the work efficiency of the balancing work.

In view of the above issue, an object of at least one embodiment of the present invention is to provide an unbalance detection device capable of suppressing resonance with respect to vibration upon rotation of the rotor of the turbo-cartridge, and performing the balancing work efficiently while improving the detection accuracy of unbalance of the rotor.

Solution to the Problems (1) According to at least one embodiment of the present invention, an unbalance detection device for detecting unbalance of a rotor of a turbo-cartridge which includes the rotor including a turbine wheel and a compressor wheel coupled via a rotational shaft and a bearing housing accommodating a bearing which supports the rotor rotatably, includes: a turbine-side housing member accommodating the turbine wheel; a compressor-side housing member accommodating the compressor wheel; a support mechanism configured to nip and support the turbo-cartridge from both sides by pressing at least one of the turbine-side housing member or the compressor-side housing member toward the turbo-cartridge; a vibration insulator interposed in each of a gap between the turbine-side housing member and the turbo-cartridge and a gap between the compressor-side housing member and the turbo-cartridge; and a vibration sensor installed so as to be contactable with the bearing housing, the vibration sensor being capable of detecting vibration upon rotation of the rotor.

With the above configuration (1), the turbo-cartridge is supported in a state where the turbo-cartridge is nipped from both sides by the turbine-side housing member and the compressor-side housing member via the vibration insulator. In other words, the vibration insulator insulates vibration between the unbalance detection device and the turbo-cartridge (reduce transmitted vibration). Accordingly, in the unbalance detection work, it is possible to suppress resonance of the unbalance detection device with respect to vibration upon rotation of the rotor, and it is possible to improve the efficiency of the balancing work while improving the unbalance detection accuracy.

Furthermore, by installing the vibration sensor on the bearing housing of the turbo-cartridge, it is possible to detect vibration of the rotor in a state where the vibration insulator is not disposed in the transmission path of vibration from the rotor to the vibration sensor, and detect vibration of the rotor efficiently.

(2) In some embodiments, in the above configuration (1), the turbo-cartridge is supported by the support mechanism in a state where the turbo-cartridge is in contact with the vibration insulator while not being in contact with the turbine-side housing member and the compressor-side housing member.

With the above configuration (2), the turbo-cartridge is in contact with the support mechanism only via the vibration insulator. Thus, with the vibration insulator, it is possible to insulate vibration between the unbalance detection device and the turbo-cartridge even more appropriately.

(3) In some embodiments, in the above configuration (1) or (2), the unbalance detection device further includes a biasing member configured to bias the vibration sensor toward the bearing housing.

With the above configuration (3), the vibration sensor is biased and thereby installed on the bearing housing. That is, when installing the vibration sensor on the bearing housing, the vibration sensor is not fixed on the bearing housing with, for instance, screws or adhesive. Accordingly, it is possible to install the vibration sensor on the bearing housing efficiently, and perform the unbalance detection work efficiently. Furthermore, with the elastic force of the biasing member, it is possible to reduce the effect of supporting the vibration sensor on the bearing housing on the vibration property upon rotation of the rotor.

(4) In some embodiments, in the above configuration (3), the unbalance detection device further includes an oil supply pipe for supplying lubricant oil into the bearing housing, the oil supply pipe being configured to be capable of connecting to and separating from an oil supply port formed on the bearing housing. The biasing member is installed on the oil supply pipe so that the vibration sensor is biased toward the bearing housing in a state where the oil supply pipe is connected to the oil supply port formed on the bearing housing.

With the above configuration (4), the vibration sensor is biased toward the bearing housing when the oil supply pipe is connected to the oil supply port of the bearing housing. That is, connection of the oil supply pipe to the oil supply port of the bearing housing is in conjunction with biasing of the vibration sensor by the biasing member. Accordingly, it is possible to install the vibration sensor on the bearing housing efficiently, and perform the unbalance detection work efficiently.

(5) In some embodiments, in the above configuration (4), the unbalance detection device further includes a sensor installation device for installing the vibration sensor to the oil supply pipe. The sensor installation device includes: a support base supporting the vibration sensor on a first surface of the support base; and a guide member fixed to the oil supply pipe and configured to guide the support base in a direction along a normal direction of an opening plane of the oil supply port. The biasing member is configured to bias the vibration sensor toward the bearing housing by being in contact with a second surface of the support base.

With the above configuration (5), the vibration sensor is supported on the sensor installation device fixed to the oil supply pipe. Furthermore, when connecting the oil supply pipe to the oil supply port of the bearing housing, the support base supporting the vibration sensor slides while being guided by the guide member, and thereby the vibration sensor is installed on the bearing housing while being biased by the biasing member via the support base. That is, the vibration sensor is configured to be installed on the bearing housing, in accordance with the connection motion of the oil supply pipe to the oil supply port of the bearing housing. Accordingly, it is possible to install the vibration sensor more efficiently.

(6) In some embodiments, in the above configuration (5), the guide member includes a body portion having a tubular shape and a bottom portion formed on a first end side of the body portion. The support base is accommodated in the body portion so as to be slidable. The biasing member is accommodated between the bottom portion and the second surface of the support base, in the body portion. On a second end side of the body portion, a locking portion for preventing the support base from falling out from the body portion is disposed.

With the above configuration (6), the support member and the biasing member are accommodated between the bottom portion and the locking portion inside the tubular guide member. Accordingly, it is possible to reduce the size of the sensor installation device and facilitate installation to the oil supply pipe.

(7) In some embodiments, in the above configuration (5) or (6), the vibration sensor is supported on a surface of the support base via a sensor-side vibration insulator.

With the above configuration (7), by using the sensor-side vibration insulator, it is possible to insulate vibration between the vibration sensor and the oil supply pipe, via the sensor installation device as a vibration transmission path. Accordingly, it is possible to enhance the accuracy of detection of the vibration signal from the rotor by the vibration sensor.

(8) In some embodiments, in any one of the above configurations (4) to (7), the oil supply port faces upward in a state where the turbo-cartridge is supported by the support mechanism, and the biasing member is configured to bias the vibration sensor downward in a state where the oil supply pipe is connected to the oil supply port.

With the above configuration (8), the direction in which the biasing member biases the vibration sensor and the gravity direction are the same, and thus the vibration sensor and the bearing housing can be in good contact.

(9) In some embodiments, in any one of the above configurations (4) to (8), the bearing housing includes a sensor contact mount having a flat surface shape, for being in contact with the vibration sensor, and the sensor contact mount is configured such that a normal direction of an opening plane of the oil supply port and a normal direction of the sensor contact mount are the same.

With the above configuration (9), upon installation to the bearing housing, the vibration sensor is configured to be in contact with a sensor contact mount having a flat surface shape. Furthermore, the sensor contact mount having a flat surface shape is formed on the bearing housing such that the normal direction of the sensor contact mount and the normal direction of the opening plane of the oil supply port are the same. Accordingly, by connecting the oil supply pipe to the bearing housing, it is possible to create suitable connection between the bearing housing and the vibration sensor, when the vibration sensor is installed on the bearing housing.

(10) According to at least one embodiment of the present invention, an unbalance detection method for detecting unbalance of a rotor of a turbo-cartridge which includes the rotor including a turbine wheel and a compressor wheel coupled via a rotational shaft and a bearing housing accommodating a bearing which supports the rotor rotatably, includes: a vibration insulator installation step of interposing a vibration insulator in each of a gap between a turbine-side housing member which accommodates the turbine wheel of the rotor and the turbo-cartridge and a gap between a compressor-side housing member which accommodates the compressor wheel of the rotor and the turbo-cartridge; a support step of nipping and supporting the turbo-cartridge from both sides by pressing at least one of the turbine-side housing member or the compressor-side housing member toward the turbo-cartridge via the vibration insulator; and a sensor installation step of installing a vibration sensor capable of detecting vibration upon rotation of the rotor so that the vibration sensor is in contact with the bearing housing.

With the above configuration (10), similarly to the above (1), in the unbalance detection work, it is possible to suppress resonance of the unbalance detection device with respect to vibration upon rotation of the rotor, and it is possible to improve the efficiency of the balancing work while improving the unbalance detection accuracy. Furthermore, by installing the vibration sensor on the bearing housing of the turbo-cartridge, it is possible to detect vibration of the rotor in a state where the vibration insulator is not disposed in the transmission path of vibration, and detect vibration of the rotor efficiently.

(11) In some embodiments, in the above configuration (10), the support step includes supporting the turbo-cartridge in a state where the turbo-cartridge is in contact with the vibration insulator while not being in contact with the turbine-side housing member and the compressor-side housing member.

With the above configuration (11), similarly to the above (2), with the vibration insulator, it is possible to insulate vibration between the unbalance detection device and the turbo-cartridge even more appropriately.

(12) In some embodiments, in the above configuration (10) or (11), the sensor installation step includes biasing the vibration sensor toward the bearing housing.

With the above configuration (12), similarly to the above (3), it is possible to install the vibration sensor on the bearing housing efficiently, and perform the unbalance detection work efficiently. Furthermore, with the elastic force of the biasing member, it is possible to reduce the effect of supporting the vibration sensor on the bearing housing on the vibration property upon rotation of the rotor.

(13) In some embodiments, in the above configuration (12), the unbalance detection method further includes a biasing member installation step of installing a biasing member to an oil supply pipe for supplying lubricant oil into the bearing housing so as to bias the vibration sensor toward the bearing housing, by connecting the oil supply pipe to an oil supply port formed on the bearing housing.

With the above configuration (13), similarly to the above (4), connection of the oil supply pipe to the oil supply port of the bearing housing is in conjunction with biasing of the vibration sensor by the biasing member, and thereby it is possible to install the vibration sensor on the bearing housing efficiently, and perform the unbalance detection work efficiently.

Advantageous Effects

According to at least one embodiment of the present invention, it is possible to provide an unbalance detection device capable of suppressing resonance with respect to vibration upon rotation of the rotor of the turbo-cartridge, and performing the balancing work efficiently while improving the detection accuracy of unbalance of the rotor.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
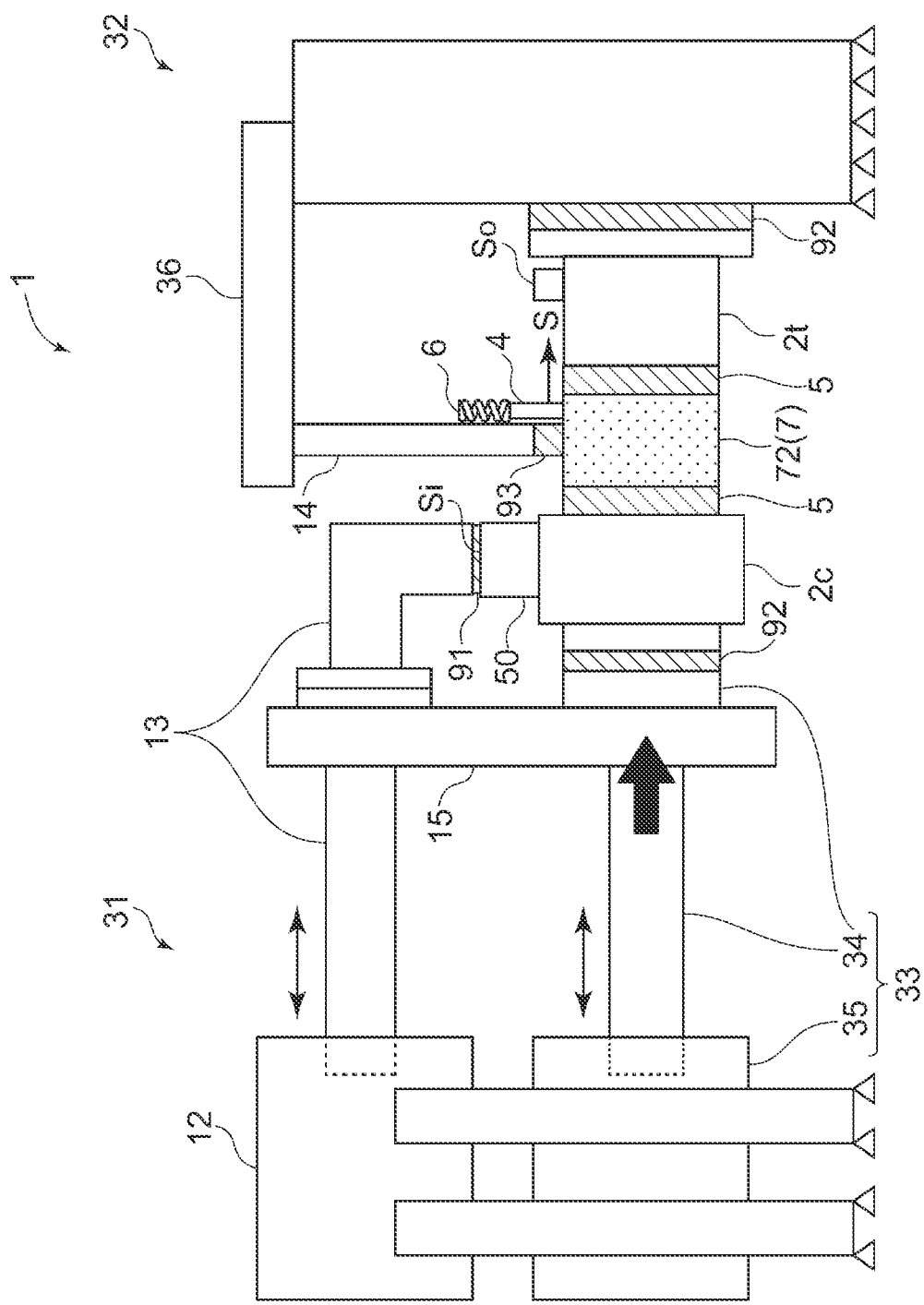
FIG. 1 is a schematic diagram of an unbalance detection device according to an embodiment of the present invention, illustrating a state where a turbo-cartridge is supported by the unbalance detection device.
Figure 2A:
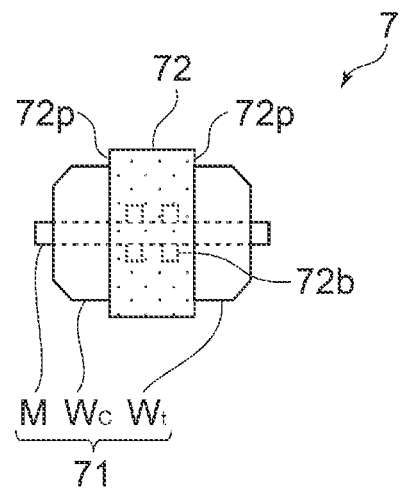
FIG. 2A is a diagram schematically showing a turbo-cartridge according to an embodiment of the present invention.
Figure 2B:
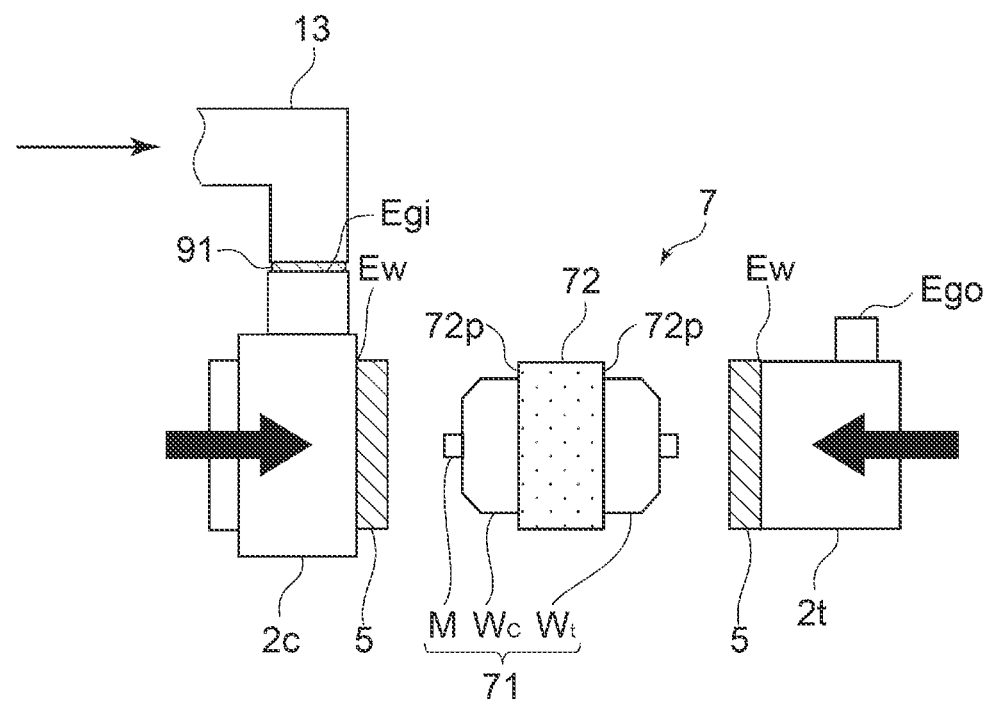
FIG. 2B is a diagram for describing how the turbo-cartridge in FIG. 2A is nipped and supported from both sides with housing members of the unbalance detection device, to support the cartridge.
Figure 3:
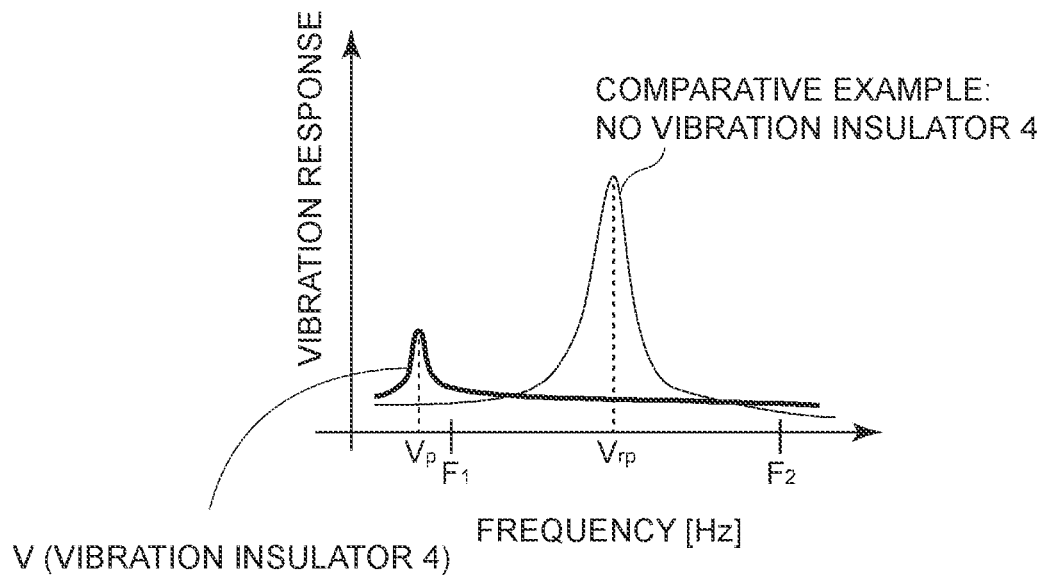
FIG. 3 is a diagram for describing the vibration property in a state where the rotor supporting the turbo-cartridge via a vibration insulator is in rotation, according to an embodiment of the present invention.
Figure 4:
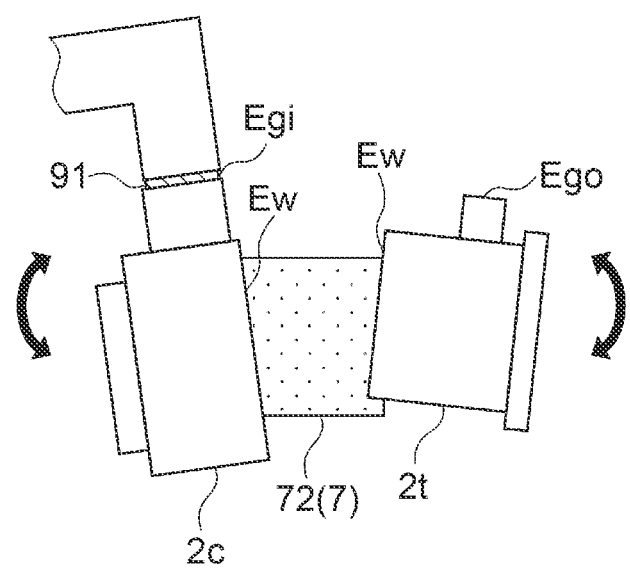
FIG. 4 is a reference diagram for describing the vibration mode that occurs when the turbo-cartridge is supported without using a vibration insulator, according to an embodiment of the present invention.

FIG. 1 is a schematic diagram of an unbalance detection device 1 according to an embodiment of the present invention, where a turbo-cartridge 7 is supported by the unbalance detection device 1. FIG. 2A is a diagram schematically showing the turbo-cartridge 7 according to an embodiment of the present invention. FIG. 2B is a diagram for describing how the turbo-cartridge 7 in FIG. 2A is nipped and supported from both sides with housing members (2t, 2c) of the unbalance detection device 1. FIG. 3 is a diagram for describing the vibration property V in a state where the rotor 71 supporting the turbo-cartridge 7 via a vibration insulator 5 is in rotation, according to an embodiment of the present invention. FIG. 4 is a reference diagram for describing the vibration mode that occurs when the turbo-cartridge 7 is supported without using a vibration insulator 5, according to an embodiment of the present invention.

As depicted in FIGS. 1 to 2B, the unbalance detection device 1 includes a turbine-side housing member 2t, a compressor-side housing member 2c, a support mechanism 3, a vibration sensor 4, and a vibration insulator 5.

The unbalance detection device 1 is a device used in the balancing work of the rotor 71 of the turbo cartridge 7. The unbalance detection device 1 is configured to be capable of supporting the turbo-cartridge 7 by the clamp method in a state where the rotor 71 is rotatable, and detecting vibration upon rotation that occurs due to unbalance of the rotor 71. The clamp method mentioned herein refers to the support method of supporting the turbo-cartridge 7 by a force applied in directions facing each other from both sides of the axial direction of the rotational shaft M of the rotor 71 (pressing force). Specifically, as depicted in FIGS. 1 to 2B, the unbalance detection device 1 nips the turbo-cartridge 7 from both sides to support the turbo-cartridge 7 with two housing members including a turbine-side housing member 2t and a compressor-side housing member 2c. Thus, in the clamp method, bolt fastening is not used along with the support, such as further fastening the two housing members with bolts, or fastening each of the two housing members with the turbo-cartridge 7 (bearing housing 72 described below) with bolts. Furthermore, the unbalance detection device 1 detects vibration upon rotation of the rotor 71 while rotating the rotor 71 at a predetermined rotation speed (unbalance detection rotation speed N). It is possible to obtain the vibration property V (see FIG. 3) by performing frequency analysis such as Fourier transform on the detected vibration signal S.

Meanwhile, the cartridge 7 is a core member of the turbocharger, and includes a rotor 71 integrally coupling a turbine wheel Wt and a compressor wheel Wc with the rotational shaft M, and a bearing housing 72 that accommodates a bearing (not depicted) supporting the rotor 71 rotatably (see FIG. 2A). Further, when the turbo-cartridge 7 is provided for an engine of a non-depicted automobile, for instance, the turbo-cartridge 7 is configured such that the turbine wheel Wt disposed in the exhaust passage of the engine rotates due to exhaust gas discharged from the engine, and thereby the compressor wheel Wc coaxially coupled by the rotational shaft M rotates in the intake passage of the engine, thereby compressing intake air to the engine. In the embodiment depicted in FIGS. 1 to 3, the turbo-cartridge 7 is a component of a turbocharger including a radial turbine.

Hereinafter, each of the above features of the unbalance detection device 1 will be described.

The turbine-side housing member 2t is a housing member capable of accommodating the turbine wheel Wt. Furthermore, the compressor-side housing member 2c is a housing member capable of accommodating the compressor wheel Wc. That is, the housing members (2t, 2c) each include an interior space for accommodating a wheel (Wt, Wc) such as the turbine wheel Wt and the compressor wheel Wc, and a wheel opening Ew through which the wheel can be carried in and out the interior space. Further, when the unbalance detection device 1 supports the turbo-cartridge 7, as depicted in FIG. 2B, the turbine wheel Wt is accommodated in the interior space of the turbine-side housing member 2t via the wheel opening Ew, and the compressor wheel Wc is accommodated in the interior space of the compressor-side housing member 2c via the wheel opening Ew. At this time, each of the two housing members supports a support-receive portion 72p formed on the bearing housing 72 of the turbo-cartridge 7, and thereby supports the turbo-cartridge 7. The support-receive portion 72p is disposed in a region of the bearing housing 72 facing the edge portion of the wheel opening Ew of the housing member (see FIGS. 2A to 2B).

Further, in a state where the turbo-cartridge 7 is supported on the unbalance detection device 1, the rotor 71 is rotated by supplying air (gas) to one of the compressor wheel Wc or the turbine wheel Wt. The air for rotating the rotor 71 is supplied via an air opening Eg formed on the housing member. In the embodiment depicted in FIGS. 1 to 3, the unbalance detection device 1 is configured to rotate the rotor 71 by supplying air to the compressor wheel Wc accommodated in the compressor-side housing member 2c. Thus, on the compressor-side housing member 2c, an inlet-side air opening Egi (air opening Eg) is formed so that air can be supplied in the radial direction to the compressor wheel Wc accommodated therein, and a non-depicted outlet-side air opening (air opening Eg) is formed to discharge supplied air from the interior space of the compressor-side housing member 2c. Furthermore, the unbalance detection device 1 is configured to connect a blower 12 for supplying air and the inlet-side air opening Egi of the compressor-side housing member 2c via the air supply pipe 13, and supply air to the compressor wheel Wc from the blower 12. Furthermore, the air supply pipe 13 and the housing member (in the present embodiment, the compressor-side housing member 2c) is connected via a pipe vibration insulator 91 (e.g. elastic member such as rubber), so as to reduce vibration on the side of the unbalance detection device 1 transmitted to the housing member (2c) via the air supply pipe 13 as a vibration transmission path.

Furthermore, at the rotor 71, the turbine wheel Wt rotates along with rotation of the compressor wheel Wc, and thereby the turbine wheel Wt generates a flow of air. Thus, in the embodiment depicted in FIGS. 1 to 3, on the turbine-side housing member 2t, air openings Eg are formed, such as the outlet-side air opening Ego and the inlet-side air opening Egi (not shown), for allowing a flow of air generated by rotation of the compressor wheel Wc to flow outside. In some other embodiments, air may be supplied to the turbine wheel Wt to rotate the rotor 71. In this case, the inlet-side air opening Egi and the outlet-side air opening Ego are formed on the turbine-side housing member 2t, and at least the outlet-side air opening Ego is formed on the compressor-side housing member 2c.

The support mechanism 3 is configured to nip and support the turbo-cartridge 7 from both sides, by pressing at least one of the turbine-side housing member 2t or the compressor-side housing member 2c toward the turbo-cartridge 7. As depicted in FIG. 1, the support mechanism 3 includes a compressor-side support mechanism 31 connected to the compressor-side housing member 2c, and a turbine-side support mechanism 32 connected to the turbine-side housing member 2t. The compressor-side support mechanism 31 and the turbine-side support mechanism 32 are each fixed to the floor of the factory, for instance, so that the turbo-cartridge 7 does not move when pushed. Furthermore, both of the support mechanisms (31, 32) are connected to the turbine-side housing member 2t and the compressor-side housing member 2c, above the floor surface, so that the housing members (2t, 2c) do not make contact with the floor surface. At this time, connection between the compressor-side housing member 2c and the compressor-side support mechanism 31 (pressing rod 34 of the pressing device 33 described below), and connection between the turbine-side housing member 2t and the turbine-side support mechanism 32 are each achieved via a support-mechanism vibration insulator 92 (e.g. elastic member such as rubber), so as to reduce vibration on the side of the unbalance detection device 1 transmitted to the housing member (2c) via the compressor-side support mechanism 31 and the turbine-side support mechanism 32 as vibration transmission paths.

In the embodiment depicted in FIGS. 1 to 3, the compressor-side support mechanism 31 includes a pressing device 33 configured to press the compressor-side housing member 2c toward the turbo-cartridge 7. More specifically, as depicted in FIG. 1, the pressing device 33, the compressor-side housing member 2c, the turbo-cartridge 7, the turbine-side housing member 2t, and the turbine-side support mechanism 32 are arranged in this order along the pressing direction (direction of the arrow in FIGS. 1 and 2B). Thus, the pressing force by the pressing device 33 is transmitted to the turbine-side support mechanism 32 through the above arrangement, and the turbo-cartridge 7 is supported by the pressing force from the pressing device 33 and the reactive force from the turbine-side support mechanism 32. Further, in the embodiment depicted in FIGS. 1 to 3, the pressing device 33 includes a pressing rod 34 connected to the housing member (2c), and a piston device 35 that pushes the pressing rod 34 out toward the housing member (2c). Further, as the piston device 35 pushes the pressing rod 34 out toward the housing member (2c), the housing member (2c) is pressed toward the turbo-cartridge 7. Furthermore, the pressing rod 34 and the air supply pipe 13 are coupled to each other via a coupling member 15, and the air supply pipe 13 is configured to move so as to expand and contract from the blower 12 as the pressing rod 34 moves in the pressing direction.

The vibration sensor 4 is disposed so as to be capable of being in contact with the bearing housing 72, and is configured to be capable of detecting vibration upon rotation of the rotor 71. Furthermore, the vibration sensor 4 is a contact-type sensor fixed to a measurement target whose vibration is to be measured, and detects vibration as the sensor itself vibrates together with the measurement target. In the embodiment depicted in FIGS. 1 to 3, the vibration sensor 4 is an acceleration-detection type sensor (acceleration sensor). The resolution of a contact-type sensor is necessary to detect the weak vibration signal S during rotation of the rotor 71, and a contact-type sensor is employed because a typical non-contact type sensor cannot detect the above described weak signal S with a required accuracy. Non-contact type sensors (gap sensors) include eddy-current type sensors, capacitance sensors, optical sensors, and ultrasonic sensors. Furthermore, as described below, the vibration insulator 5 is interposed between the housing members (2t, 2c) and the turbo-cartridge 7, and the vibration sensor 4 is disposed on the bearing housing 72 of the turbo-cartridge 7 to detect vibration upon rotation of the rotor 71 appropriately. The bearing housing 72 supports the bearing 72b (see FIG. 2A) inside thereof, and supports the rotor 71 via the bearing 72b. That is, vibration upon rotation of the rotor 71 that occurs due to unbalance of the rotor 71 is transmitted to the bearing housing 72 via the bearing 72b, and the vibration sensor 4 detects vibration transmitted to the bearing housing 72.

The vibration insulator 5 is interposed in each of the gap between the turbine-side housing member 2t and the turbo-cartridge 7, and the gap between the compressor-side housing member 2c and the turbo-cartridge 7. The vibration insulator 5 is a member capable of insulating the housing members (2t, 2c) and the turbo-cartridge 7 in terms of vibration (reduce vibration), and is formed of an elastic member such as rubber. The vibration insulator 5 may be a member formed of the same material as the pipe vibration insulator 91 and the support-mechanism vibration insulator 92 described above. In the embodiment depicted in FIGS. 1 to 3, as described above, the housing members (2t, 2c) support the support-receive portion 72p of the bearing housing 72 via the vibration insulator 5. Specifically, the vibration insulator 5 is disposed on the edge portion of the wheel opening Ew of each of the two housing members (see FIG. 2B). Further, when the wheel is housed in each housing member and the turbo-cartridge 7 is nipped by the two housing members, the vibration insulator 5 disposed on the edge portion of the wheel opening Ew of the housing member makes contact with the support-receive portion 72$p$ of the bearing housing 72. In the present embodiment, the wheel opening Ew has a circular shape. Thus, the vibration insulator 5 has an annular shape having a greater diameter than the wheel opening Ew, and conforming to this, the support-receive portion 72$p$ has a circular shape.

As described above, the turbo-cartridge 7 is supported via the vibration insulator 5, and thereby it is possible to suppress (avoid) resonance of the unbalance detection device 1 including the housing members (2$t$, 2$c$) in response to vibration when the rotor 71 is rotated at the above described unbalance detection rotation speed N. This will be described with reference to FIG. 3. In FIG. 3, x-axis is the frequency (Hz), and y-axis is the vibration response (magnitude of vibration). Further, the unique frequency of the unbalance detection device 1 including the housing members (2$t$, 2$c$) according to the present embodiment is in between the lower limit frequency F1 and the upper limit frequency F2, which is higher than the lower limit frequency F1. Further, the vibration property V (frequency property of vibration property) indicated by the solid line in FIG. 3 corresponds to a case where the turbo-cartridge 7 is supported via the vibration insulator 5 as in the above described embodiment. As indicated by the solid line in FIG. 3, when the rotor 71 is rotated at the unbalance detection rotation speed N, the vibration component when the frequency is Vp is the peak of vibration response. However, the peak frequency Vp is lower than the lower limit frequency F1 (Vp<F1), and is out of the range of the unique frequency (range between F1 and F2) of the unbalance detection device 1. Further, the vibration response in the range of the unique frequency is so small that its effect on the unbalance detection work can be ignored.

In contrast, the vibration property Vr indicated by the thin line in FIG. 3 as a comparative example corresponds to a case where the turbo-cartridge 7 is supported by two housing members (2$t$, 2$c$) being in direct contact with the support-receive portion 72$p$ of the turbo-cartridge 7. As indicated by the thin line in FIG. 3, when the rotor 71 is rotated at the unbalance detection rotation speed N, in the vibration property Vr of the comparative example, the vibration component when the frequency is Vpr is the peak of vibration response. Further, the peak frequency Vrp of the comparative example is in between the lower limit frequency F1 and the upper limit frequency F2 (F1≤Vrp≤F2). Thus, in the unbalance detection work, due to the above described difference in the manner of contact between the bearing housing 72 and the housing members, resonance occurs when the unique frequency of the unbalance detection device 1 and the peak frequency (Vrp) are equal. For instance, as depicted in FIG. 4, resonance generates such vibration that the turbo-cartridge 7 and the two housing members (2$t$, 2$c$) nipping the turbo-cartridge 7 bend as a whole. The vibration upon rotation of the rotor 71 detected at the time of occurrence of such resonance is affected significantly by resonance, and does not appropriately reflect vibration due to unbalance of the rotor 71. Thus, it is difficult to balance the rotor 71 on the basis of the grinding information calculated from the vibration signal S detected at the time of resonance.

With the above configuration, the turbo-cartridge 7 is supported in a state where the turbo-cartridge 7 is nipped from both sides by the turbine-side housing member 2$t$ and the compressor-side housing member 2$c$ via the vibration insulator 5. In other words, the vibration insulator 5 insulates vibration between the unbalance detection device 1 and the turbo-cartridge 7. Accordingly, in the unbalance detection work, it is possible to suppress resonance of the unbalance detection device 1 in response to vibration upon rotation of the rotor 71, and it is possible to improve the efficiency of the balancing work while improving the unbalance detection accuracy. Furthermore, by installing the vibration sensor 4 on the bearing housing 72 of the turbo-cartridge 7, it is possible to detect vibration of the rotor 71 in a state where the vibration insulator 5 is not disposed in the transmission path of vibration, and detect vibration of the rotor 71 efficiently.

Furthermore, in the embodiment depicted in FIGS. 1 to 3, as depicted in FIG. 1, the turbo-cartridge 7 is supported by the support mechanism 3 in a state where the turbo-cartridge 7 is not in contact with the turbine-side housing member 2$t$ and the compressor-side housing member 2$c$, but in contact with the vibration insulator 5. In other words, the turbo-cartridge 7 is in contact with the support mechanism 3 only via the vibration insulator 5. Thus, with the vibration insulator 5, it is possible to insulate vibration between the unbalance detection device 1 and the turbo-cartridge 7 even more appropriately.

Furthermore, in the embodiment depicted in FIGS. 1 to 3, as depicted in FIG. 1, the unbalance detection device 1 further includes a biasing member 6 that biases the vibration sensor 4 toward the bearing housing 72. The biasing member 6 is a spring capable of applying a biasing force to the vibration sensor 4, with energy accumulated by deformation or elasticity of the biasing member 6, and is formed so as to be capable of utilizing elasticity of a material such as metal, rubber, and plastic. Further, when the vibration sensor 4 is installed on the bearing housing 72, the biasing member 6 biases the vibration sensor 4 toward the bearing housing 72 so as to achieve good vibration transmission to the vibration sensor 4. In contrast, when the vibration sensor 4 is removed from the bearing housing 72, the biasing member 6 recovers from deformation or the like to the original shape. By installing the vibration sensor 4 with the biasing member 6, it is possible to reduce the effect of the support method on the vibration property V of the rotor 71 detected by the vibration sensor 4. For instance, if the vibration sensor 4 is pushed against the bearing housing 72 with a non-elastic member, the rod-shaped member itself may affect the vibration property V of vibration of the rotor 71 that the vibration sensor 4 detects.

With the above configuration, the vibration sensor 4 is biased and thereby installed on the bearing housing 72. That is, when installing the vibration sensor 4 on the bearing housing 72, the vibration sensor 4 is not fixed on the bearing housing 72 with, for instance, screws or adhesive. Accordingly, it is possible to install the vibration sensor on the bearing housing efficiently, and perform the unbalance detection work efficiently. Furthermore, with the elastic force of the biasing member 6, it is possible to reduce the effect of supporting the vibration sensor 4 on the bearing housing 72 on the vibration property V upon rotation of the rotor 71.

Nevertheless, the present invention is not limited to the above described embodiment. In some other embodiments, when installing the vibration sensor 4 on the bearing housing 72, the vibration sensor 4 may be fixed on the bearing housing 72 with, for instance, screws or adhesive. Also in this embodiment, vibration upon rotation of the rotor 71 can be detected appropriately.

Figure 5A:
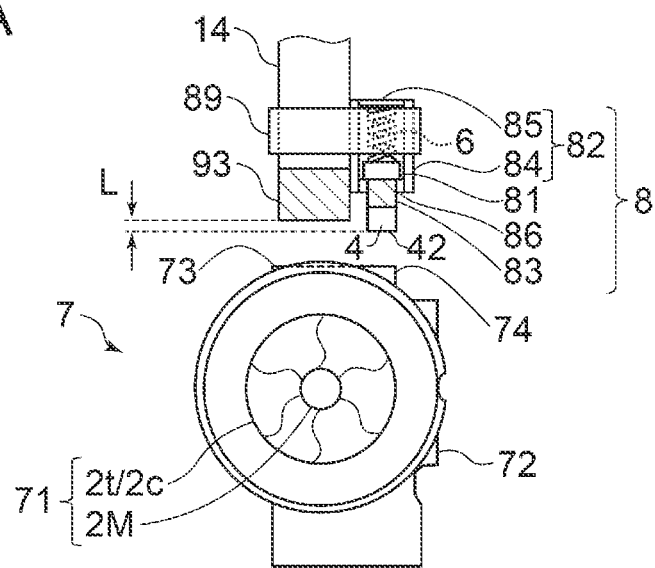
FIG. 5A is a schematic side view for describing the sensor installation device disposed in an oil supply pipe according to an embodiment of the present invention, where a vibration sensor is detached from the bearing housing.
Figure 5B:
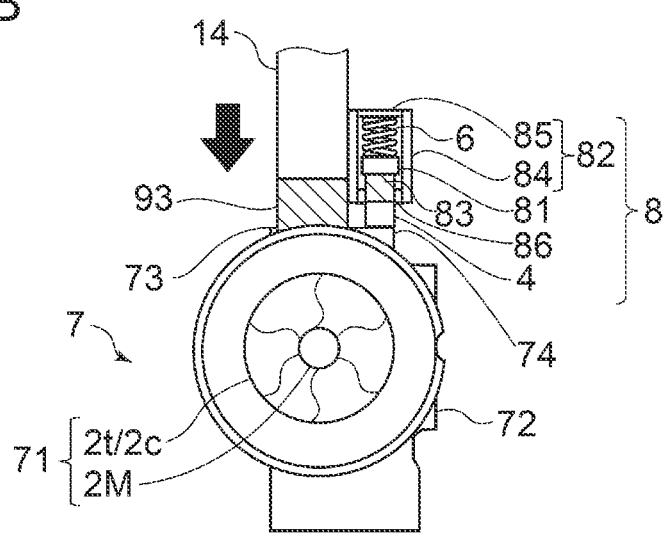
FIG. 5B is a schematic side view for describing the sensor installation device disposed in an oil supply pipe according to an embodiment of the present invention, where a vibration sensor is installed on the bearing housing.
Figure 5C:
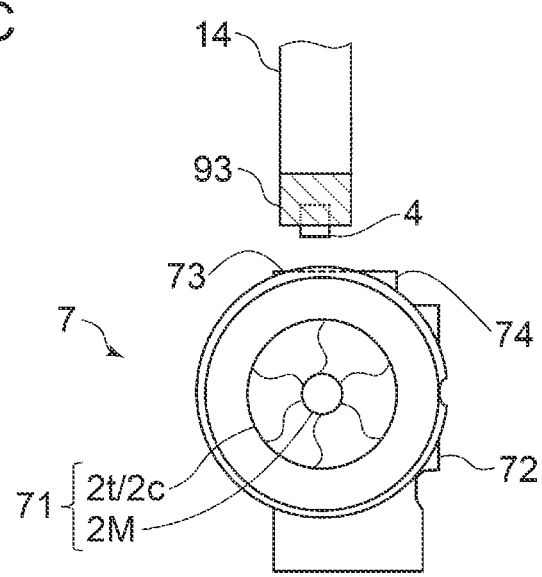
FIG. 5C is a schematic side view for describing the sensor installation device disposed in an oil supply pipe according to an embodiment of the present invention, where the vibration sensor is disposed on an oil-supply-pipe vibration insulator of the oil supply pipe.

Next, installation of the vibration sensor 4 on the bearing housing 72 will be described in detail with reference to FIGS. 5A to 5C. FIG. 5A is a schematic side view for describing the sensor installation device 8 disposed in an oil supply pipe 14 according to an embodiment of the present invention, showing a state where a vibration sensor is detached from the bearing housing 72. FIG. 5B is a schematic side view for describing the sensor installation device 8 disposed in the oil supply pipe 14 according to an embodiment of the present invention, showing a state where the vibration sensor 4 is installed on the bearing housing 72. Furthermore, FIG. 5C is a schematic side view for describing the sensor installation device 8 disposed in the oil supply pipe 14 according to an embodiment of the present invention, where the vibration sensor 4 is disposed on an oil-supply-pipe vibration insulator 93 of the oil supply pipe 14. In FIG. 5B, the fixing band 89 in FIG. 5A is not depicted.

In some embodiments, as depicted in FIGS. 1, 5A to 5C, the unbalance detection device 1 further includes an oil supply pipe 14 for supplying lubricant oil into the bearing housing 72, configured to be connectable to and separatable from the oil supply port 73 formed on the bearing housing 72. Furthermore, as depicted in FIGS. 5A to 5C, the biasing member 6 is disposed on the oil supply pipe 14 so that the vibration sensor 4 is biased with respect to the bearing housing 72, in a state where the oil supply pipe 14 is connected to the oil supply port 73 formed on the bearing housing 72. In the embodiment depicted in FIGS. 1 to 5C, the oil supply pipe 14 is supported on the tip side of a support arm 36 extending toward the compressor-side support mechanism 31 from an upper part of the turbine-side support mechanism 32. Furthermore, in a state where the turbo-cartridge 7 is supported by the support mechanism 3, the oil supply port 73 of the bearing housing 72 is facing upward in the vertical direction, and the oil supply pipe 14 is disposed above the turbo-cartridge 7 (see FIG. 1).

Furthermore, the support arm 36 is capable of moving the oil supply pipe 14 up and down along the vertical direction, and the oil supply pipe 14 and the oil supply port 73 are connected as the oil supply pipe 14 is moved downward in the vertical direction (direction of the gravity). At this time, an oil-supply-pipe vibration insulator 93 is disposed on a portion of the oil supply pipe 14 connecting to the oil supply port 73, so as to reduce vibration of the unbalance detection device 1 transmitted to the turbo-cartridge 7 via the oil supply pipe 14 as a transmission path. Further, when the oil supply pipe 14 is connected to the oil supply port 73, the vibration sensor 4 becomes biased toward the bearing housing 72. That is, connection of the oil supply pipe 14 to the oil supply port 73 of the bearing housing 72 is in conjunction with biasing of the vibration sensor 4 by the biasing member 6. Accordingly, it is possible to install the vibration sensor 4 on the bearing housing 72 efficiently, and perform the unbalance detection work efficiently.

The above described biasing of the vibration sensor 4 by the biasing member 6 in conjunction with connection of the oil supply pipe 14 to the oil supply port 73 will be described in detail. In some embodiments, the sensor installation device 8 depicted in FIGS. 5A and 5B may be used for the biasing. This embodiment will be described later. In some other embodiments, as depicted in FIG. 5C, the vibration sensor 4 may be disposed on the oil-supply-pipe vibration insulator 93 of the oil supply pipe 14. In this case, the oil-supply-pipe vibration insulator 93 serves as the biasing member 6. In the embodiment depicted in FIG. 5C, the vibration sensor 4 is embedded in the oil-supply-pipe vibration insulator 93, so that a part of the vibration sensor 4 protrudes from the tip of the oil-supply-pipe vibration insulator 93 (end portion facing the oil supply port 73). Further, when the oil supply pipe 14 is connected to the oil supply port 73, the protruding portion of the vibration sensor 4 makes contact with a portion of the bearing housing 72 around the oil supply port 73 and is pushed, whereby the oil-supply-pipe vibration insulator 93 becomes deformed. That is, the oil-supply-pipe vibration insulator 93 biases the vibration sensor 4 toward the bearing housing 72.

Furthermore, the embodiment depicted in FIGS. 5A and 5B will be described. As depicted in FIGS. 5A and 5B, the unbalance detection device 1 further includes a sensor installation device 8 for installing the vibration sensor 4 on the oil supply pipe 14. The sensor installation device 8 includes a support base 81 supporting the vibration sensor 4 with a surface (hereinafter, sensor support surface), and a guide member 82 fixed to the oil supply pipe 14 and configured to guide the support base 81 in a direction along the normal direction of the opening plane of the oil supply port 73. The biasing member 6 is in direct contact with another surface (hereinafter, biasing surface) of the support base 81, and thereby bias the vibration sensor 4 toward the bearing housing 72. That is, the sensor installation device 8 is fixed to the oil supply pipe 14 so as to move in the vertical direction of the oil supply pipe 14 together with the biasing member 6. Further, the oil supply pipe 14 is, when connected to the oil supply port 73, brought closer to the oil supply port 73 along the normal direction of the opening plane of the oil supply port 73 (hereinafter, also referred to as "connection direction"), and thus the direction in which the guide member 82 guides the support base 81 (guide direction) is the same as the above normal direction. The guide member 82 is configured to be capable of moving (sliding) the support base 81 along the guide direction, while maintaining a state where the sensor support surface of the support base 81 and the bearing housing 72 are facing each other. Further, when the oil supply pipe 14 and the oil supply port 73 are connected, the support base 81 moves (recedes) in a direction opposite to the direction in which the oil supply pipe 14 is brought closer toward the oil supply port 73 in the above connection direction by the guide member 82. On the other hand, the biasing member 6 is disposed on the biasing surface of the support base 81 so as to be contactable, and as the support base 81 recedes, the biasing member 6 deforms, for instance, thereby becoming biased.

In the embodiment depicted in FIGS. 5A and 5B, the sensor installation device 8 is fixed on the oil supply pipe 14 with a fixing band 89. The sensor installation device 8 may be fixed by another method such as bonding and welding. Further, the support base 81 is a plate-shaped member having a predetermined thickness, and includes a sensor support surface being a surface that supports the vibration sensor 4, and a biasing surface opposite to the sensor support surface, as described above. Further, the sensor support surface of the support base 81 is disposed on the sensor installation device 8 in a state of facing downward in the vertical direction, that is the side of the bearing housing 72 (installation side).

Further, as depicted in FIG. 5A, in a state where the vibration sensor 4 is removed from the bearing housing 72, the contact surface 42 of the vibration sensor 4 being in contact with the bearing housing 72 protrudes so as to be proximal to the bearing housing 72 compared to an end portion of the guide member 82. Furthermore, the contact surface 42 of the vibration sensor 4 protrudes so as to be proximal to the bearing housing 72 by a predetermined distance L from the tip of the oil supply pipe 14. Thus, when the oil supply pipe 14 is brought closer to the bearing housing 72 along the connection direction to be connected to the oil supply port 73, the contact surface 42 of the vibration sensor 4 makes contact with the bearing housing 72 (sensor contact mount 74), before the oil supply pipe 14 makes contact with the oil supply port 73. Furthermore, when the oil supply pipe 14 is brought closer to the bearing housing 72 along the connection direction, the contact surface 42 of the vibration sensor 4 is pushed along the connection direction by the bearing housing 72. Thus, the vibration sensor 4 supported on the support base 81 recedes along the guide member 82. Further, as depicted in FIG. 5B, when the oil supply pipe 14 is connected to the oil supply port 73 (when connection is completed), the vibration sensor 4 recedes by the predetermined distance L. In this state, the biasing member 6 is deformed, for instance, and is accumulating energy. That is, the biasing member 6 is biasing the vibration sensor 4 via the support base 81 while being in contact with the biasing surface of the support base 81.

With the above configuration, the vibration sensor 4 is supported on the sensor installation device 8 fixed to the oil supply pipe 14. Furthermore, when connecting the oil supply pipe 14 to the oil supply port 73 of the bearing housing 72, the support base 81 supporting the vibration sensor 4 slides while being guided by the guide member 82, and thereby the vibration sensor 4 is installed on the bearing housing 72 while being biased by the biasing member 6 via the support base 81. That is, the vibration sensor 4 is configured to be installed on the bearing housing 72, in accordance with the connection motion of the oil supply pipe 14 to the oil supply port 73 of the bearing housing 72. Accordingly, it is possible to install the vibration sensor efficiently.

More specifically, in the embodiment depicted in FIGS. 5A and 5B, the guide member 82 includes a body portion 84 having a tubular shape, and a bottom portion 85 formed on one end side of the body portion 84. The support base 81 is accommodated in the body portion 84 so as to be slidable. The biasing member 6 is accommodated between the bottom portion 85 of the body portion 84 and the other surface of the support base 81. On the other end side of the body portion 84, disposed is a locking portion 86 for preventing the support base 81 from falling off from the body portion 84. In other words, the guide member 82 is a bottomed tubular container including the body portion 84 and the bottom portion 85, and accommodates the support base 81 and the biasing member 6 in the container with the body portion 84, and the bottom portion 85 and the locking portion 86 on the opposite ends in the guide direction. Thus, when the oil supply pipe 14 and the oil supply port 73 are connected, the biasing member 6 is pressed by the bottom portion 85 and the support base 81, and thereby becomes biased. In the embodiment depicted in FIGS. 5A and 5B, the tubular body portion 84 has a circular cross section. Further, the support base 81 has a column shape whose bottom surface is the sensor installation surface and whose upper surface is the biasing surface, or vice versa, according to the shape of the body portion 84.

Further, the shape of the support base 81 may not necessarily be a column shape, and may be another shape as long as the support base 81 is movable in accordance with the guide by the guide member 82. For instance, in some other embodiments, the support base 81 may have a square-column shape, and the guide member 82 may form the body portion 84 with four rod-shape portions having a L-shaped cross section and being capable of guiding the four respective corners of the support base 81 having a square-column shape along the guide direction, the four rod-shaped members being coupled to one another on one end side via a bottom portion 85.

With the above configuration, the support base 81 and the biasing member 6 are accommodated between the bottom portion 85 and the locking portion 86, inside the tubular guide member 82. Accordingly, it is possible to reduce the size of the sensor installation device 8 and facilitate installation of the sensor installation device 8 to the oil supply pipe 14.

Further, in some other embodiments, the bottom portion 85 may not necessarily be formed on one end side of the body portion 84, and for instance, the bottom portion 85 may be fixed to the oil supply pipe 14 or the support arm 36 independently at a position away from the one end side of the body portion 84. For instance, the bottom portion 85 and the body portion 84 may be provided separately. Furthermore, in any embodiment, the biasing member 6 may be fixed to at least one of the bottom portion 85 or the support base 81, or the biasing member 6 may not necessarily be fixed to both of the bottom portion 85 and the support base 81.

Further, in some embodiments, as depicted in FIGS. 5A and 5B, the vibration sensor 4 is supported on a surface of the support base 81 via the sensor-side vibration insulator 83. With the above configuration, by using the sensor-side vibration insulator 83, it is possible to insulate vibration between the vibration sensor 4 and the oil supply pipe 14, via the sensor installation device 8 as a vibration transmission path. Accordingly, it is possible to enhance the accuracy of detection of the vibration signal S from the rotor 71 by the vibration sensor 4.

In the above described embodiment, the oil supply port 73 is facing upward in a state where the turbo-cartridge 7 is supported by the support mechanism 3, and the biasing member 6 is configured to bias the vibration sensor 4 downward in a state where the oil supply pipe 14 is connected to the oil supply port 73 (see FIGS. 1 to 3). Accordingly, the direction in which the biasing member 6 biases the vibration sensor and the gravity direction are the same, and thus the vibration sensor and the bearing housing are in good contact. However, the present invention is not limited to the present embodiment. For instance, the turbo-cartridge 7 may be supported on the unbalance detection device 1 so that the oil supply port 73 of the bearing housing 72 is oriented in a direction other than the upward direction. In this case, the oil supply pipe is connected to the oil supply port 73 from the above other direction, and thus the vibration sensor 4 fixed to the oil supply pipe 14 is biased toward the other direction. For instance, if the above other direction is more upward than the horizontal direction, it is possible to bias the vibration sensor 4 with the biasing member 6 and supply lubricant oil, without receiving a force component in the opposite direction due to gravity.

Further, in some embodiments, as depicted in FIGS. 5A and 5B, the bearing housing 72 includes a sensor contact mount 74 having a flat surface shape for being in contact with the vibration sensor 4. The sensor contact mount 74 is configured such that the normal direction of the opening plane of the oil supply port 73 and the normal direction of the sensor contact mount 74 are the same. In the embodiment depicted in FIGS. 5A and 5B, the contact surface of the vibration sensor 4 is formed to have a flat surface shape, and the sensor contact mount 74 having a flat surface shape is formed on the bearing housing 72 such that the normal direction of the sensor contact mount 74 and the normal direction of the opening plane of the oil supply port 73 are the same. Accordingly, by connecting the oil supply pipe 14 to the bearing housing 72, it is possible to create suitable contact between the bearing housing 72 and the vibration sensor 4, when the vibration sensor 4 is installed on the bearing housing 72.

Figure 6:
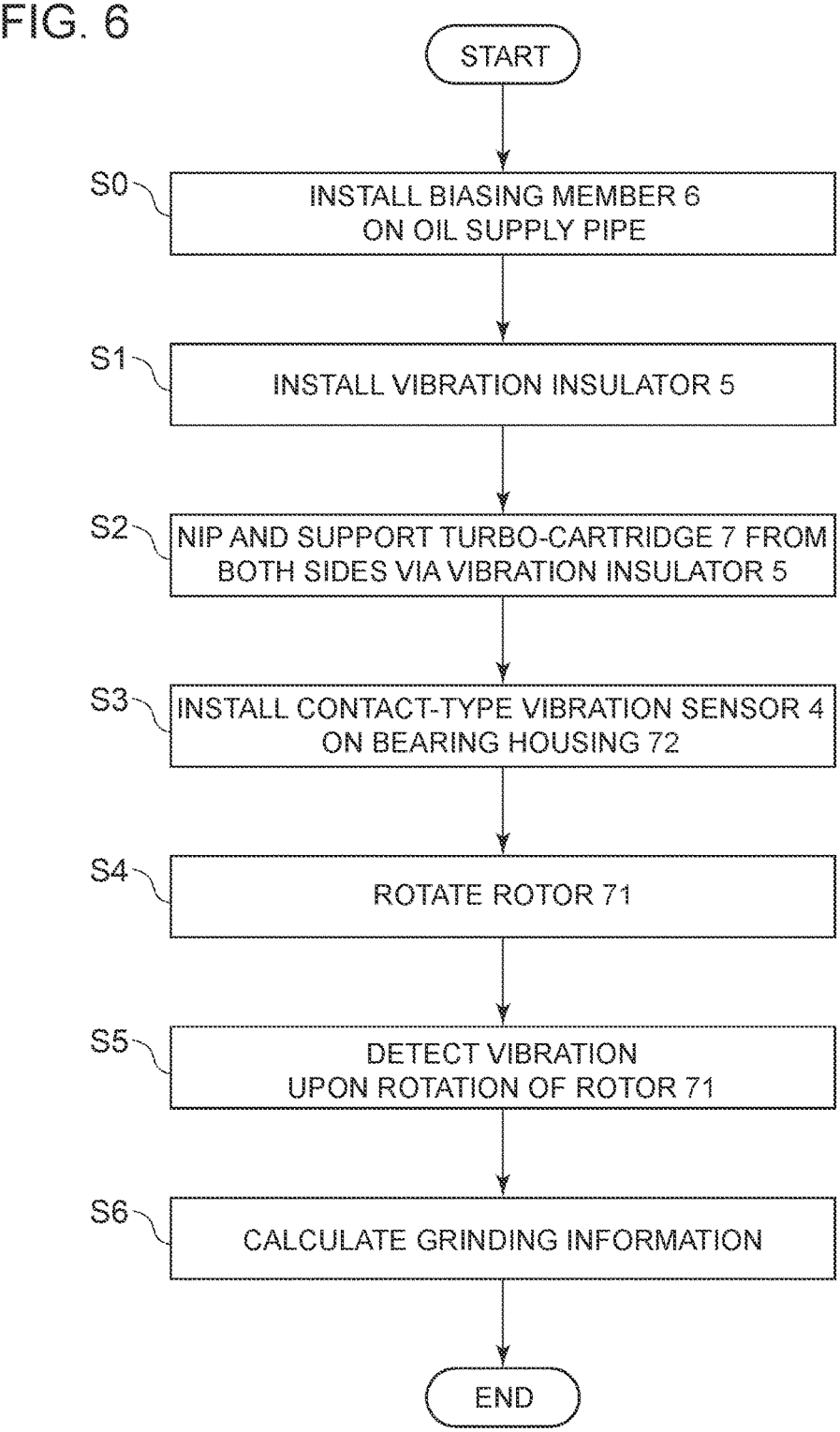
FIG. 6 is a flowchart showing an unbalance detection method according to an embodiment of the present invention.

Hereinafter, the unbalance detection method of the rotor 71 of the turbo-cartridge 7 (hereinafter, unbalance detection method) will be described with reference to FIG. 6. FIG. 6 is a flowchart showing an unbalance detection method according to an embodiment of the present invention. As depicted in FIG. 6, the unbalance detection method includes a vibration insulator installation step (S1), a support step (S2), and a sensor installation step (S3). Further, as depicted in FIG. 6, the unbalance detection method may include a biasing member placement step (S0), before the vibration insulator installation step (S1). Further, after the sensor installation step (S3), the method may include a rotor rotation step (S4), a vibration detection step (S5), and a grinding-information calculation step (S6), in this order.

Hereinafter, the unbalance detection method will be described with reference to the flow in FIG. 6.

In step S0 of FIG. 6, the biasing member placement step is performed. The biasing member placement step (S0) is a step of placing (fixing) the biasing member 6 on the oil supply pipe 14, and is performed as preparation for detecting unbalance of the turbo-cartridge 7. That is, in a case where the biasing member 6 is already installed on the oil supply pipe 14 by using the above described sensor installation device 8 or the like, the biasing member placement step (S0) can be omitted. Furthermore, the biasing member placement step (S0) includes connecting the oil supply pipe 14 for supplying lubricant oil into the bearing housing 72 to the oil supply port 73 formed on the bearing housing 72, and thereby placing the biasing member 6 on the oil supply pipe 14 so as to bias the vibration sensor 4 toward the bearing housing 72. That is, connection of the oil supply pipe 14 to the oil supply port 73 of the bearing housing 72 is in conjunction with biasing of the vibration sensor 4 by the biasing member 6.

In step S1 of FIG. 6, the vibration insulator installation step is performed. The vibration insulator installation step (S1) includes interposing the vibration insulator 5 between each of the gap between the turbine-side housing member 2*t* accommodating the turbine wheel Wt of the rotor 71 and the turbo-cartridge 7, and the gap between the compressor-side housing member 2*c* accommodating the compressor wheel Wc of the rotor 71 and the turbo-cartridge 7. The vibration insulator 5 is a member for insulating vibration between the housing members (2*t*, 2*c*) and the turbo-cartridge 7, as described above. For instance, in a case where the vibration insulator 5 is disposed on the edge portion of the wheel opening Ew of each of the two housing members, the vibration insulator installation step (S1) is performed by providing the vibration insulator 5 for the unbalance detection device 1 to support the turbo-cartridge 7 (see FIG. 2B).

In step S2 of FIG. 6, a support step is performed. The support step (S2) is a step of nipping and supporting the turbo-cartridge 7 from both sides in the axial direction of the rotational shaft M via the vibration insulator 5. More specifically, the support step (S2) includes nipping and supporting the turbo-cartridge 7 from both sides, by pressing at least one of the turbine-side housing member 2*t* or the compressor-side housing member 2*c* toward the turbo-cartridge 7 via the vibration insulator 5. That is, the turbo-cartridge 7 is supported by the clamp method via the vibration insulator 5. Accordingly, in the unbalance detection work, it is possible to suppress resonance of support side of the turbo-cartridge 7 (e.g. turbine-side housing member 2*t* and compressor-side housing member 2*c*) in response to vibration upon rotation of the rotor 71, and it is possible to improve the efficiency of the balancing work while improving the unbalance detection accuracy. In the support step, the turbo-cartridge 7 may be supported in a state where the turbo-cartridge 7 is not in contact with the turbine-side housing member 2*t* and the compressor-side housing member 2*c*, but with the vibration insulator 5. In this way, it is possible to insulate vibration between the support side and the turbo-cartridge 7 more appropriately.

In step S3 of FIG. 6, a sensor installation step is performed. The sensor installation step (S3) includes installing the vibration sensor 4 capable of detecting vibration upon rotation of the rotor 71, so that the vibration sensor 4 is in contact with the bearing housing 72. For instance, the vibration sensor 4 is an acceleration sensor. Further, the sensor installation step may include biasing the vibration sensor 4 toward the bearing housing 72. Accordingly, it is possible to install the vibration sensor 4 on each mass-produced turbo-cartridge 7 efficiently, and perform the unbalance detection work efficiently. Furthermore, with the elastic force of the biasing member, it is possible to reduce the effect of supporting the vibration sensor 4 on the bearing housing 72 on the vibration property V upon rotation of the rotor 71. Furthermore, for instance, in the embodiment in which the above described step S0 is performed, connection of the oil supply pipe 14 to the oil supply port 73 of the bearing housing 72 is in conjunction with biasing of the vibration sensor 4 by the biasing member 6, and thus it is possible to install the vibration sensor 4 efficiently, and perform the unbalance detection work more efficiently.

In step S4 of FIG. 6, a rotor rotation step of rotating the rotor 71 is performed. For instance, as described above, the rotor 71 is rotated by supplying air with the blower 12 to the turbine-side housing member 2*t* or the compressor-side housing member 2*c* that support the turbo-cartridge 7.

In step S5 of FIG. 6, a vibration detection step of detecting vibration upon rotation of the rotor 71 is performed. Specifically, the vibration sensor 4 installed on the turbo-cartridge 7 detects the vibration signal S of the above vibration generated due to unbalance of the rotor 71. Furthermore, the phase of the rotor 71 may be detected simultaneously when the vibration sensor 4 detects the vibration signal S. For instance, the phase (rotational position) in a single rotation of the rotor 71 can be obtained by emitting light to a reflector disposed on the blade of the turbine wheel Wt or the compressor wheel Wc, and detecting the reflection light (signal). Accordingly, it is possible to determine the phase of the rotor that is causing vibration on the basis of a relationship between the vibration signal S detected with the vibration sensor 4 and the phase of the rotor.

In step S6 of FIG. 6, a grinding-information calculation step of calculating grinding information is performed. The grinding information is information including the optimum weight amount and position for balancing the rotor 71, calculated on the basis of the signal detected in the above vibration detection step (S5). In the balancing work, the rotor 71 is ground on the basis of the grinding information, and thereby balancing of the rotor 71 is performed. The grinding information is calculated by using the vibration signal S detected by the vibration sensor 4, the phase of the rotor, and the effect vector. The effect vector is information indicating the relationship between the mass to be ground (unit weight) and the corresponding magnitude of vibration, which is obtained by performing a test in advance on the same product as the turbo-cartridge 7 under the balancing work.

Embodiments of the present invention were described in detail above, but the present invention is not limited thereto, and various amendments and modifications may be implemented.

DESCRIPTION OF REFERENCE NUMERALS

1 Unbalance detection device
12 Blower
13 Air supply pipe
14 Oil supply pipe
15 Coupling member
2c Compressor-side housing member
2t Turbine-side housing member
3 Support mechanism
31 Compressor-side support mechanism
32 Turbine-side support mechanism
33 Pressing device
34 Pressing rod
35 Piston device
36 Support arm
4 Vibration sensor
42 Contact surface
5 Vibration insulator
6 Biasing member
7 Turbo-cartridge
71 Rotor
72 Bearing housing
72b Bearing
72p Support-receive portion
73 Oil supply port
74 Sensor contact mount
8 Sensor installation device
81 Support base
82 Guide member
83 Sensor-side vibration insulator
84 Body portion
85 Bottom portion
86 Locking portion
91 Pipe vibration insulator
92 Support-mechanism vibration insulator
93 Oil-supply-pipe vibration insulator
Wc Compressor wheel
Wt Turbine wheel
M Rotational shaft
Ew Wheel opening
Eg Air opening
Egi Inlet-side air opening
Ego Outlet-side air opening
N Unbalance detection rotation speed
Vibration property
Vp Peak frequency
Vr Vibration property (comparative example)
Vrp Peak frequency (comparative example)
F1 Lower limit frequency
F2 Upper limit frequency
L Predetermined distance

The invention claimed is:

1. An unbalance detection device for detecting unbalance of a rotor of a turbo-cartridge which includes the rotor including a turbine wheel and a compressor wheel coupled via a rotational shaft and a bearing housing accommodating a bearing which supports the rotor rotatably, the unbalance detection device comprising:

a turbine-side housing accommodating the turbine wheel;
a compressor-side housing accommodating the compressor wheel;
a support mechanism configured to nip and support the turbo-cartridge from both sides by pressing at least one of the turbine-side housing or the compressor-side housing toward the turbo-cartridge, the support mechanism including a pressing rod and a piston device configured to push the pressing rod;
a vibration insulator interposed in each of a gap between the turbine-side housing and the turbo-cartridge and a gap between the compressor-side housing and the turbo-cartridge;
a vibration sensor installed so as to be contactable with the bearing housing, the vibration sensor detecting vibration upon rotation of the rotor; and
a biasing member configured to bias the vibration sensor toward the bearing housing, the biasing member being an elastic member,
wherein the unbalance detection device further comprises an oil supply pipe for supplying lubricant oil into the bearing housing, the oil supply pipe being selectively connected to and separated from an oil supply port formed on the bearing housing, and
wherein the biasing member is installed on the oil supply pipe so that the vibration sensor is biased toward the bearing housing in a state where the oil supply pipe is connected to the oil supply port formed on the bearing housing,
wherein the bearing housing includes a sensor contact mount having a flat surface that makes contact with the vibration sensor, and
wherein the oil supply pipe includes an oil-supply-pipe vibration insulator disposed on a portion of the oil supply pipe connected to the oil supply port, the oil-supply-pipe vibration insulator being configured to reduce vibration transmitted between the oil supply pipe and the turbo-cartridge.

2. The unbalance detection device according to claim 1, wherein the turbo-cartridge is supported by the support mechanism in a state where the turbo-cartridge is in contact with the vibration insulator while not being in contact with the turbine-side housing and the compressor-side housing.

3. The unbalance detection device according to claim 1, further comprising:
a sensor installation device for installing the vibration sensor to the oil supply pipe,
wherein the sensor installation device includes:
a support base supporting the vibration sensor on a first surface of the support base; and
a guide member fixed to the oil supply pipe and configured to guide the support base in a direction along a normal direction of an opening plane of the oil supply port, the guide member having a guiding portion extending in the direction along the normal direction, and
wherein the biasing member is configured to bias the vibration sensor toward the bearing housing by being in contact with a second surface of the support base.

4. The unbalance detection device according to claim 3, wherein the vibration sensor is supported on a surface of the support base via a sensor-side vibration insulator.

5. The unbalance detection device according to claim 1, wherein the oil supply port faces upward in a state where the turbo-cartridge is supported by the support mechanism, and wherein the biasing member is configured to bias the vibration sensor downward in a state where the oil supply pipe is connected to the oil supply port.

6. The unbalance detection device according to claim 1, wherein the sensor contact mount is configured such that a normal direction of an opening plane of the oil supply port and a normal direction of the sensor contact mount are the same.

7. An unbalance detection device for detecting unbalance of a rotor of a turbo-cartridge which includes the rotor including a turbine wheel and a compressor wheel coupled via a rotational shaft and a bearing housing accommodating a bearing which supports the rotor rotatably, the unbalance detection device comprising:
   a turbine-side housing accommodating the turbine wheel;
   a compressor-side housing accommodating the compressor wheel;
   a support mechanism configured to nip and support the turbo-cartridge from both sides by pressing at least one of the turbine-side housing or the compressor-side housing toward the turbo-cartridge, the support mechanism including a pressing rod and a piston device configured to push the pressing rod;
   a vibration insulator interposed in each of a gap between the turbine-side housing and the turbo-cartridge and a gap between the compressor-side housing and the turbo-cartridge;
   a vibration sensor installed so as to be contactable with the bearing housing, the vibration sensor detecting vibration upon rotation of the rotor; and
   a biasing member configured to bias the vibration sensor toward the bearing housing, the biasing member being an elastic member,
   wherein the unbalance detection device further comprises an oil supply pipe for supplying lubricant oil into the bearing housing, the oil supply pipe being selectively connected to and separated from an oil supply port formed on the bearing housing,
   wherein the biasing member is installed on the oil supply pipe so that the vibration sensor is biased toward the bearing housing in a state where the oil supply pipe is connected to the oil supply port formed on the bearing housing,
   wherein the unbalance detection device further comprises a sensor installation device for installing the vibration sensor to the oil supply pipe,
   wherein the sensor installation device includes:
      a support base supporting the vibration sensor on a first surface of the support base; and
      a guide member fixed to the oil supply pipe and configured to guide the support base in a direction along a normal direction of an opening plane of the oil supply port, the guide member having a guiding portion extending in the direction along the normal direction,
   wherein the biasing member is configured to bias the vibration sensor toward the bearing housing by being in contact with a second surface of the support base,
   wherein the guide member includes a body portion having a tubular shape and a bottom portion formed on a first end side of the body portion,
   wherein the support base is accommodated in the body portion so as to be slidable,
   wherein the biasing member is accommodated between the bottom portion and the second surface of the support base, in the body portion, and
   wherein, on a second end side of the body portion, a lock being configured to prevent the support base from falling out from the body portion is disposed.

8. The unbalance detection device according to claim 7, wherein the vibration sensor is supported on a surface of the support base via a sensor-side vibration insulator.

9. The unbalance detection device according to claim 7, wherein the oil supply port faces upward in a state where the turbo-cartridge is supported by the support mechanism, and
   wherein the biasing member is configured to bias the vibration sensor downward in a state where the oil supply pipe is connected to the oil supply port.

10. The unbalance detection device according to claim 7, wherein the bearing housing includes a sensor contact mount having a flat surface shape, for being in contact with the vibration sensor, and
   wherein the sensor contact mount is configured such that a normal direction of an opening plane of the oil supply port and a normal direction of the sensor contact mount are the same.

11. An unbalance detection method for detecting unbalance of a rotor of a turbo-cartridge which includes the rotor including a turbine wheel and a compressor wheel coupled via a rotational shaft and a bearing housing accommodating a bearing which supports the rotor rotatably, the unbalance detection method comprising:
   a vibration insulator installation step of interposing a vibration insulator in each of a gap between a turbine-side housing which accommodates the turbine wheel of the rotor and the turbo-cartridge and a gap between a compressor-side housing which accommodates the compressor wheel of the rotor and the turbo-cartridge; and
   a support step of nipping and supporting the turbo-cartridge from both sides by pressing at least one of the turbine-side housing or the compressor-side housing toward the turbo-cartridge via the vibration insulator; and
   a sensor installation step of installing a vibration sensor detecting vibration upon rotation of the rotor so that the vibration sensor is in contact with the bearing housing,
   wherein the sensor installation step includes biasing the vibration sensor toward the bearing housing,
   wherein the unbalance detection method further comprises a biasing member installation step of installing a biasing member to an oil supply pipe for supplying lubricant oil into the bearing housing to bias the vibration sensor toward the bearing housing by connecting the oil supply pipe to an oil supply port formed on the bearing housing, the biasing member being an elastic member,
   wherein the bearing housing includes a sensor contact mount having a flat surface shape for being in contact with the vibration sensor, and
   wherein the oil supply pipe includes an oil-supply-pipe vibration insulator disposed on a portion of the oil supply pipe connecting to the oil supply port, the oil-supply-pipe vibration insulator being configured to reduce vibration transmitted between the oil supply pipe and the turbo-cartridge.

12. The unbalance detection method according to claim 11,
   wherein the support step includes supporting the turbo-cartridge in a state where the turbo-cartridge is in contact with the vibration insulator while not being in contact with the turbine-side housing and the compressor-side housing.

\* \* \* \* \*